United States Patent
Audy et al.

(10) Patent No.: US 6,485,769 B2
(45) Date of Patent: Nov. 26, 2002

(54) FOOD DISINFECTION USING OZONE

(75) Inventors: Stephane Audy, Quebec (CA); Fabrice Laberge, Quebec (CA); Edward F. Steiner, Lombard, IL (US); James T. C. Yuan, Naperville, IL (US)

(73) Assignees: Air Liquide Canada, Inc., Montreal (CA); American Air Liquide, Inc., Countryside, IL (US); L 'Air Liquide-Societe 'Anonyme a 'Directoire et Conseil de Surveillance pour l 'Etude et L'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/796,409

(22) Filed: Feb. 28, 2001

(65) Prior Publication Data

US 2002/0025364 A1 Feb. 28, 2002

Related U.S. Application Data

(60) Provisional application No. 60/188,962, filed on Mar. 10, 2000.

(51) Int. Cl.[7] .............................. A23B 4/16; A61L 2/00
(52) U.S. Cl. ...................... 426/320; 426/442; 426/474; 422/28; 422/33; 422/269; 422/292; 422/306
(58) Field of Search ................................ 426/320, 442, 426/474; 422/28, 33, 269, 292, 306

(56) References Cited

U.S. PATENT DOCUMENTS

| | | | |
|---|---|---|---|
| 5,281,428 A | 1/1994 | Morgan ...................... 426/312 |
| 5,431,939 A | 7/1995 | Cox et al. .................... 426/300 |
| 5,597,599 A | 1/1997 | Smith et al. ................. 426/316 |
| 5,632,903 A | 5/1997 | Caracciolo, Jr. ............. 210/741 |
| 5,667,829 A | 9/1997 | Herlig .......................... 426/238 |
| 5,703,009 A | 12/1997 | Yvin et al. ................... 504/116 |
| 5,783,242 A | * 7/1998 | Teague ......................... 426/320 |
| 5,855,794 A | 1/1999 | Caracciolo, Jr. ............. 210/739 |
| 5,858,443 A | * 1/1999 | Hei et al. ..................... 426/506 |
| 5,879,732 A | 3/1999 | Caracciiolo, Jr. et al. .... 426/231 |
| 5,902,619 A | 5/1999 | Rubow et al. ............... 426/235 |
| 5,965,087 A | 10/1999 | Caracciolo, Jr. ............. 422/28 |
| 6,066,348 A | 5/2000 | Yuan et al. .................. 426/236 |
| 6,086,833 A | 7/2000 | Conners et al. ............. 422/292 |
| 6,120,822 A | 9/2000 | Denvir et al. ................ 426/320 |
| 6,200,618 B1 | * 3/2001 | Smith et al. ................. 426/320 |
| 6,245,294 B1 | * 6/2001 | Goldberg et al. ............. 422/26 |
| 6,294,211 B1 | * 9/2001 | Yuan et al. .................. 426/235 |

FOREIGN PATENT DOCUMENTS

| | | |
|---|---|---|
| DE | 3209930 A1 | 9/1983 |
| DE | 3917250 | 12/1990 |
| JP | 01309671 | 2/1990 |
| JP | 03249985 | 2/1992 |

* cited by examiner

Primary Examiner—Nina Bhat
(74) Attorney, Agent, or Firm—Linda K. Russell

(57) ABSTRACT

Methods and apparatus are provided for decreasing the bacteria count of a food commodity without affecting its overall organoleptic quality (taste, odor, and color). This is accomplished using a treatment fluid comprising ozone, which is injected into a treatment chamber containing the food commodity. Some water is preferably added to obtain better contact of the ozone with the food by forming a thin film of ozonated water on the food surface. Spices and/or other ingredients may preferably be added with the water. The food is placed in a tumbler and the tumbler is set in motion. During treatment good contact between the treatment fluid and the food commodity is obtained by reversibly oscillating the tumbler. A log reduction of 40% or more in bacteria count may be obtained as compared without the ozone.

31 Claims, 5 Drawing Sheets

FOOD DISINFECTION USING OZONE

CROSS-REFERENCE TO RELATED APPLICATIONS

This application claims the benefit under 35 U.S.C. §119 (e) to provisional application No. 60/188,962, filed Mar. 10, 2000, the entire contents of which are incorporated herein by reference.

FIELD OF THE INVENTION

The present invention relates, in general, to methods for treating food products and, more particularly, to methods for reducing pathogenic microorganism populations on food commodities during food processing.

BACKGROUND

Microbial outgrowth is a primary cause of food spoilage. The presence of pathogenic microorganisms on food products can potentially led to food-borne outbreaks of disease and can cause significant economic loss to food processors. The need to delay the onset of spoilage has lead the food processing industry to seek effective means for disinfecting food products in order to ensure food safety. Currently, food manufacturers use several different technologies to eliminate, retard, or prevent microbial outgrowth. For example, techniques such as heating, irradiation, and application of chemical agents are currently in use. However, the effectiveness of a particular technology can depend on the particular food product and type of microorganism present on the food product. Additionally, certain chemical agents can have a deleterious effect on human health. For example, chlorine has been widely used as a sanitizer for many years, however, chlorine can produce toxic by-products, such as chloramines and trihalomethanes.

Another widely used chemical agent is ozone ($O_3$). Ozone is a very strong oxidizing agent, having an oxidation potential more than 1.5 times that of chlorine and approximately 1.3 times that of hydrogen peroxide. Ozone is normally produced by irradiating an oxygen-containing gas with ultraviolet light or corona discharge. Ozone has been widely used as a disinfectant in the food industry for many years. Processes have been developed that use gaseous ozone to sterilize and disinfect food products. Although applying gaseous ozone to food products can be an effective means of controlling microbial outgrowth, an effective method of applying the ozone to the food product must be available.

To address the public health concern associated with food contamination, development of more effective processes to ensure safe and wholesome food production has become a main strategy for the food industry. Processes for the separate application of ozone and steam in a vacuum and pressure regulated environment have been developed to improve the effectiveness of ozone at killing the bacteria present on food. In addition, continuous processes have been developed that include spraying ozone gas and a mixture of ozone and water directly onto animal carcasses immediately after slaughter.

Despite recent development of ozone application technology, food contamination by pathogenic microorganisms continues to be a significant health problem. According to recent statistics from Centers for Disease Control (CDC), there are approximately 76 million cases of food borne illness in the United States annually. The most common food-associated pathogens are: Norwalk-like viruses, *Campylobacter jejuni*, and Salmonella. *Escherichia coli* 0157:H7 and *Listeria monocytogenes* can also cause severe illness. As the world population increases, the demand for processed food will also increase and food borne illness is more likely to become an even greater problem. To address this public health concern, development of more effective processes to ensure safe and wholesome food production continues to be an important objective of the food industry.

BRIEF SUMMARY

One primary objective of this invention is to treat a food commodity, such as meat and, preferably, chicken breasts, with a fluid comprising ozone, which can be a gas, a liquid, or liquid and gas mixture, in a sealed container to obtain a lower bacterial count without affecting its organoleptic properties (overall quality of taste, odor, and color). The amount of ozone injected is preferably as small as possible, while at the same time, showing a significant log reduction on bacteria count. Some water is preferably added to obtain better contact of ozone with the food commodity by forming a thin film of ozonated water on the surface of the food commodity. Spices and/or other ingredients may be added with the water.

In one preferred method, the invention generally includes, placing a food commodity, such as meat, poultry, fish, seafood, fruits and vegetables in a sealed container, such as a treatment chamber, which can be tumbler, or an apparatus configured to receive a tumbler. A vacuum is generated in the treatment chamber and either before or during vacuum generation, a treatment fluid comprising ozone is produced to obtain a steady stream of a treatment fluid flowing through a conduit, which is vented through an exhaust system.

Once a vacuum of at least 2 inches Hg, preferably a vacuum of around 25 inches of Hg is reached, the treatment fluid is injected into the treatment chamber. The treatment fluid is injected until the pressure inside the chamber rises to about atmospheric pressure. In certain preferred embodiments of the method, an excess of ozone is introduced in the treatment chamber at a pressure slightly above atmospheric pressure, or alternatively, a residual vacuum may be beneficial for certain treatment processes.

In one embodiment of the invention, the treatment fluid contacts the food commodity through action of a tumbler. The tumbler can function as the treatment chamber, or the tumbler can be positioned within a treatment chamber. Preferably, a small amount of water is injected to create a thin water film rich in ozone. This treatment is carried out for a time sufficient to obtain good disinfection, preferably about 50% reduction in bacterial count, without affecting food quality (color, odor, taste).

The present invention contemplates a number of different motion patterns of the tumbler. During the contact period, the tumbler is preferably rotated about a rotation axis. Alternatively, the tumbler can be agitated by alternatively rotating the tumbler about a rotational axis in both a clockwise direction and a counterclockwise direction for a predetermined period of time. In another embodiment of the invention, the tumbler is axially oscillated along a shaft. In yet another embodiment, the tumbler is vibrated in a vertical or horizontal reciprocating motion or both.

After the required time, the treatment fluid is purged from the treatment chamber so that it can be opened safely. In one embodiment, the treatment chamber and associated gas lines are purged by flushing with an inert gas, such as carbon dioxide and the like.

BRIEF DESCRIPTION OF THE DRAWING

FIG. 5 is a plot illustrating microorganism population versus ozone concentration for chicken coupons processed in;

DESCRIPTION OF PREFERRED EMBODIMENTS

Figure 1:
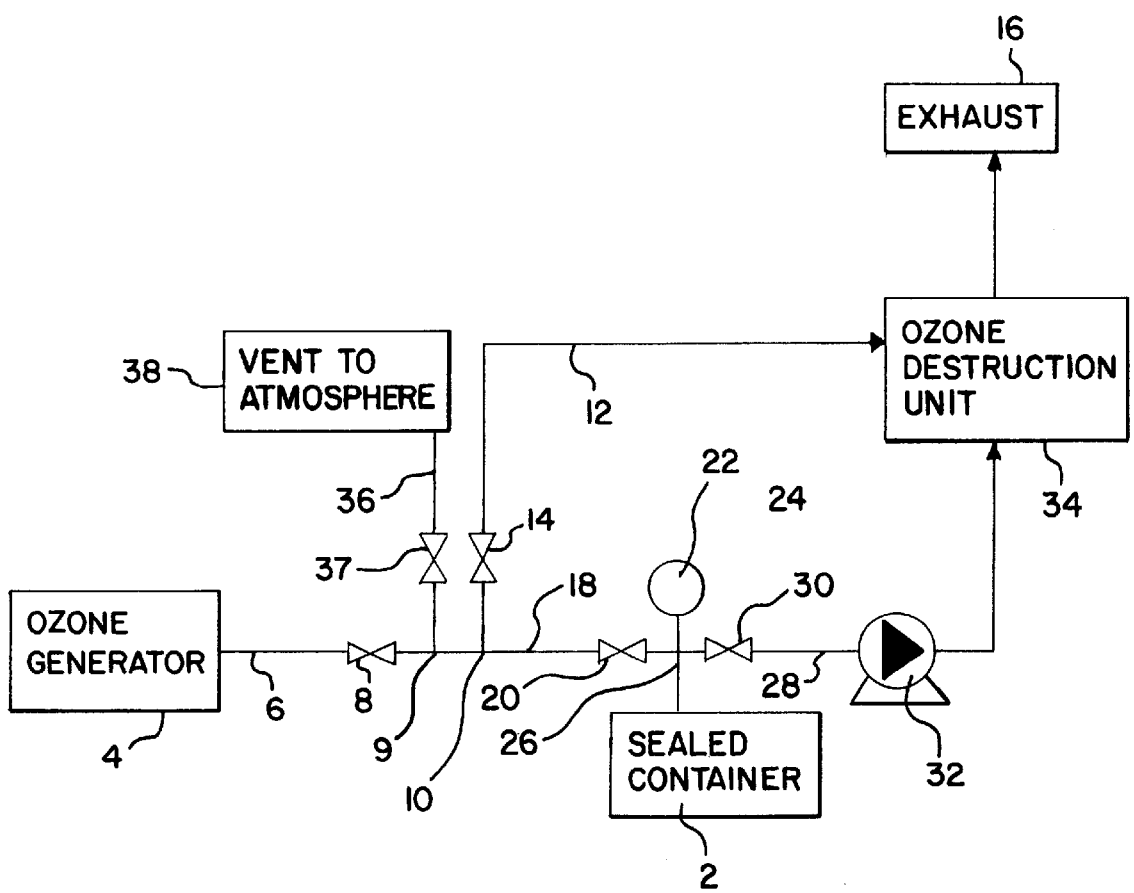
FIG. 1 illustrates a schematic diagram illustrating an apparatus arranged in accordance with the invention.

Referring now to FIG. 1, an apparatus in accordance with one embodiment of the invention is comprised of a sealed container 2, which takes feed from an ozone generator 4, via conduit 6, ozone valve 8, fittings 9 and 10, conduit 18, and valve 20. A fluid stream generated by ozone generator 4 includes from about 1% to about 20% ozone, when oxygen or air is fed to the ozone generator 4. The ozonated fluid proceeds through valve 20, through a fitting 24 having a negative pressure gauge 22, conduit 28, and conduit 26 connected to the sealed container 2. The apparatus also includes a vacuum supply valve 30, which is connected to a vacuum pump or other means for creating a vacuum 32. Vacuum 32 exhausts into an ozone destruction unit 34. A conduit 12 and valve 14 connects to an exhaust vent 16 through ozone destruction unit 34. A vent line 36 branches from conduit 6 at fitting 9 and is gated by valve 37 and is connected to an atmosphere intake 38.

In order to practice the methods of the invention, one preferred method comprises:

1. Creating a vacuum on a sealed container 2. Either before or during vacuum generation, ozone is produced, either as a gas, a liquid or a mixture of a gas and a liquid, to obtain a steady stream flowing through conduit 6, which is vented through the exhaust through fittings 10, 12, 14, and 16.

2. Once a vacuum of at least 10 inches Hg, preferably a vacuum of around 25 inches of Hg is reached, vacuum valve 30 is closed, as well as ozone exhaust valve 14, and the ozone containing fluid is injected into sealed container 2 by opening rapidly valve 20 on the ozone line 18. Ozone containing fluid is injected until the pressure inside sealed container 2 rises to about atmospheric pressure (about 1 atmosphere at sea level). In certain preferred embodiments of the method, an excess of ozone with pressure in the sealed container slightly above atmosphere or a residual vacuum, may be beneficial for certain disinfection processes.

3. The ozone containing fluid is left in contact with the meat and preferably a small amount of water is injected to create a thin water film rich in ozone containing fluid. This condition is carried out for a time sufficient to obtain good disinfection, preferably about 50% reduction in bacterial count, without affecting meat quality (color, odor, taste). During the contact period, the container is preferably agitated.

4. After the required time, vacuum pump 32 is turned on, valve 30 opened to purge the ozone containing fluid from the container 2, and valve 37 is opened to vent conduit 18 to atmospheric pressure so that sealed container 2 can be opened safely. The food commodities, such as a piece or pieces of meat, are then shipped for bacterial analysis.

At the customer site, for example, sealed container 2 is preferably the tumbler they are using to inject water and spices in batch processes on large portions of chicken breasts to obtain the desired taste (these tumblers can vary greatly in size).

In cases where an existing tumbler is to be employed, as described in the previous paragraph, the door seal is preferably modified to include an ozone compatible material, such as polyvinylfluoride (PVF), polyvinylchloride (PVC), or Viton fluoroelastomer (Viton is a trademark of DuPont de Nemours). The ozone would be injected through an ozone injector as is commonly known in various arts, for example, the water purification art.

As is commonly known, ozone generators, (such as those available from Ozonia, North America, Elmwood Park, New Jersey), utilize an air or oxygen feed gas, which converts from about 1% to about 20% of the oxygen to ozone. For an oxygen feed gas to ozone generator 4, the stream 6 will preferably have from about 1% to about 20% ozone, with the balance being oxygen and traces of nitrogen and other air gases. The fluid produced by the ozone generator can also contain one or more cryogens such as nitrogen, argon, xenon, neon, helium, and the like.

Figure 2:
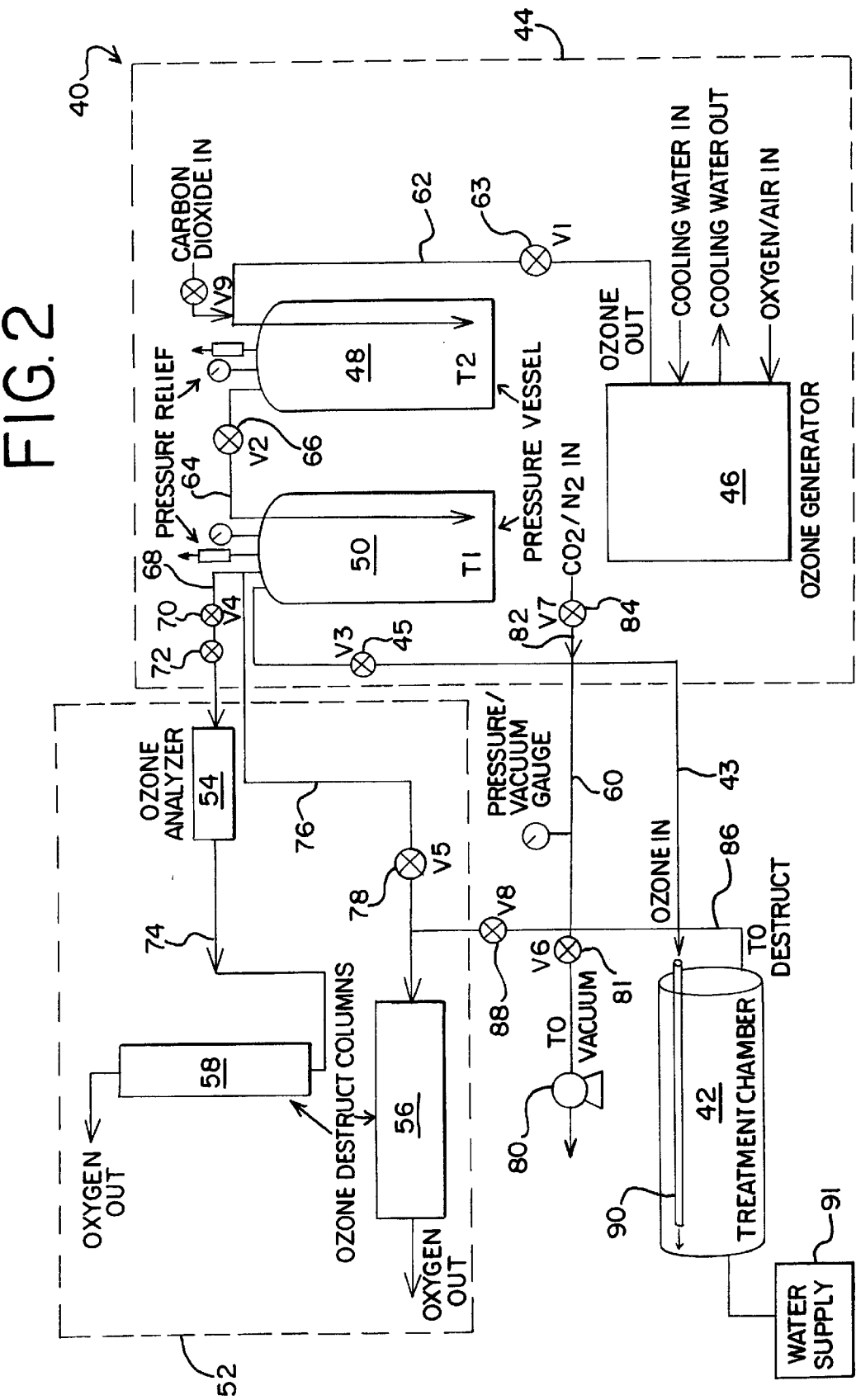
FIG. 2 illustrates a schematic diagram of an apparatus arranged in accordance with a more detailed embodiment the invention.

An apparatus 40 in accordance with a more detailed embodiment of the invention is illustrated in FIG. 2. Apparatus 40 includes, as major components, those illustrated in the apparatus of FIG. 1, together with additional components for pressurization and evacuation of the treatment chamber. Apparatus 40 is merely an example of a laboratory-scale or pilot plant system. Accordingly, a number of different equipment arrangements for treating a food commodity in accordance with the invention are possible. Those skilled in the art will appreciate that numerous modifications can be made, and that an industrial-scale processing facility may include other components, and that those components may be arranged differently from that illustrated in FIG. 2.

In apparatus 40, a barrel-type treatment chamber 42 receives treatment gas through a gas feed line 43 that is connected to a pressurized gas delivery system 44. Gas feed line 43 is equipped with a ball valve 45. In one embodiment of the invention treatment chamber 42 has a volume of about 5.6 liters.

Gas delivery system 44 includes an ozone generator 46 and pressure vessels 48 and 50. An exhaust system 52 is coupled to gas delivery system 44. Exhaust system 52 includes an ozone analyzer 54 and gas scrubbers 56 and 58. A vacuum line 60 is connected to gas feed line 43 and operates to regulate the pressure within treatment chamber 42.

Ozone generator 46 receives oxygen or air and outputs a gas comprising ozone to pressure vessel 48 through an output line 62. Output line 62 is equipped with a ball valve 63. Preferably, ozone generator 46 is a water-cooled generator similar to that described in reference to FIG. 1. In one embodiment of the invention, ozone generator 46 is an OZAT CFS-2 model generator (Ozonia Ltd., Switzerland). A desired gas pressure is maintained in pressure vessel 48 by injecting carbon dioxide, or another inert gas, into output line 62 immediately upstream from pressure vessel 48. Pressure vessel 48 is coupled to pressure vessel 50 through a gas line 64. Gas line 64 is equipped with a ball valve 66 that provides the capability to isolate pressure vessel 48 from pressure vessel 50.

Ozone analyzer 54 monitors the ozone concentration in the treatment gas within pressure vessel 50. In one embodiment, ozone analyzer 54 is a model H I ozone analyzer (IN-USA, Needham, Mass.). Ozone analyzer 54 receives sample portions of the treatment gas in pressure vessel 50 through a gas sample line 68. Gas sample line 68 is equipped with both a ball valve 70 and a needle valve 72 to enable the periodic pressure controlled delivery of gas samples to ozone analyzer 54. Ozone analyzer 54 outputs exhaust gas to gas scrubber 58 though an exhaust line 74.

Gas scrubber 56 is connected to gas sample line 68 by a vent line 76. Vent line 76 is equipped with a ball valve 78. Vent line 76 provides for the release of treatment gas from pressure vessel 50. The gas pressure within pressure vessel 50 can be controlled by properly adjusting valves 66 and 78 and by adjusting the volume of carbon dioxide or other inert gas injected into pressure vessel 48.

The flow of treatment gas into and out of treatment chamber 42 is controlled by the operation of valve 45 and valve 88. Vacuum line 60 is connected to a vacuum pump 80 and enables the evacuation of gas feed line 43 and treatment chamber 42. A gas purge line 82 is connected to gas feed line 43 at a point upstream from treatment chamber 42. The flow of an inert purge gas, such as carbon dioxide and/or nitrogen, into gas feed line 43 is controlled by operation of a ball valve 84. The treatment gas in treatment chamber 42 can be evacuated to gas scrubber 56 through an evacuation line 86. The flow of spent treatment gas through evacuation line 86 is controlled by a ball valve 88. Treatment gas is distributed within treatment chamber 42 through a manifold 90 positioned within treatment chamber 42.

Additionally, water or an aqueous solution can be introduced into treatment chamber 42 be means of a water supply 91 connected to treatment chamber 42. The water or aqueous solution can be introduced in treatment chamber 42 as a mist or liquid spray, or simply dispensed into a lower portion of the treatment chamber. Further, the water or aqueous solution can be feed into manifold 90 and mixed with the treatment gas prior to application onto the food commodity.

Figure 3:
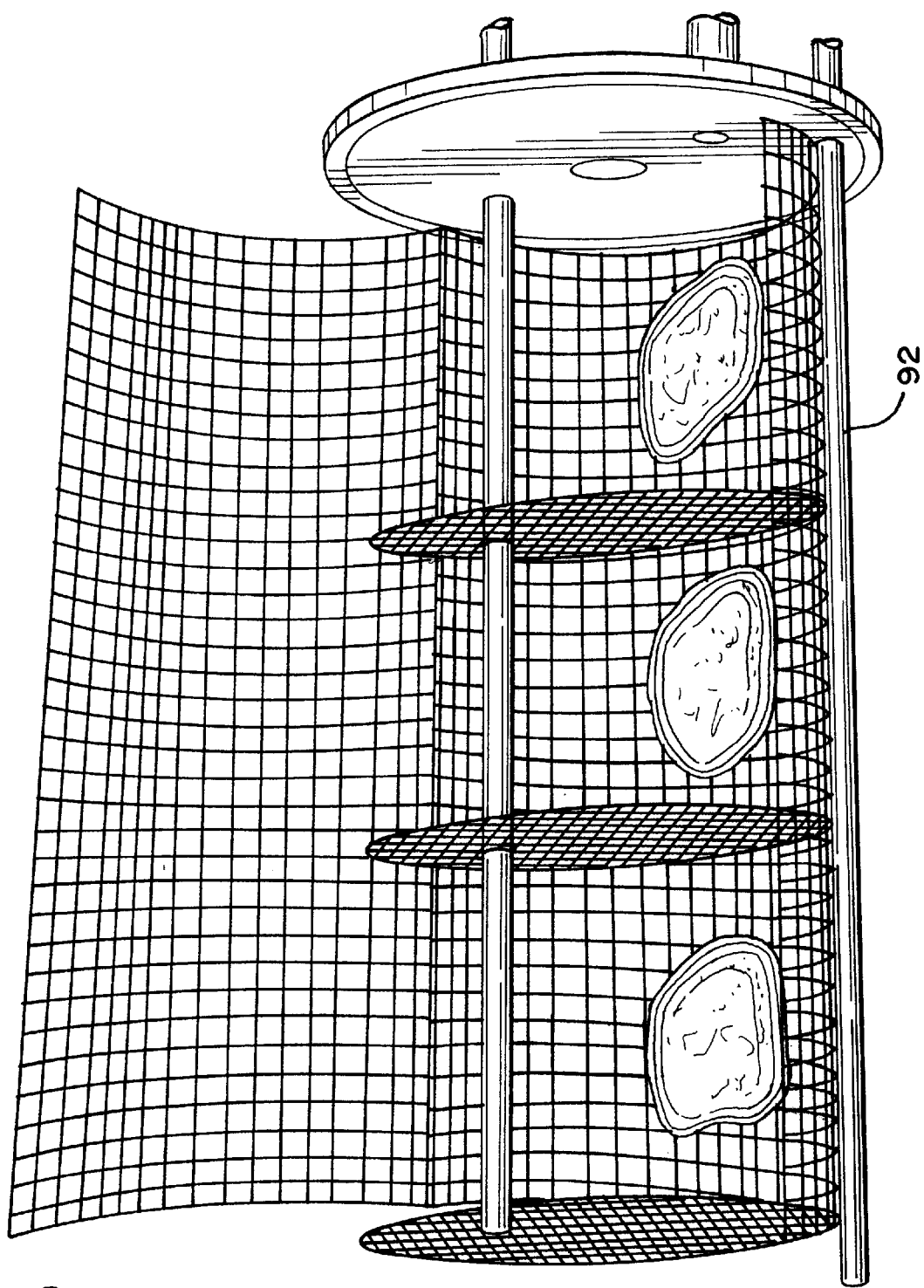
FIG. 3 illustrates a tumbler arranged in accordance with one embodiment of the invention.

Food commodities selected for treatment in treatment chamber 42 are deposited within a tumbler 92. An exemplary embodiment of a pilot-plant or laboratory scale tumbler 92 is illustrated in FIG. 3. In the illustrated embodiment, tumbler 92 is a wire cage having a generally tubular shape that contains a number of compartments 94. A shaft 96 connects tumbler 92 to an actuator (not shown). During food treatment, tumbler 92 is rotated or oscillated about shaft 96, while the food product is subjected to treatment gas dispensed through manifold 90. The tumbler 92 can be operated in a variety of rotational modes, including 360° rotation, agitational motion, partial rotation and the like. For example, tumbler 92 can turn in a full 360° rotation, or oscillate back and forth in a series of partial rotations that can vary from a few degrees to 360°. In accordance with a preferred process embodiment of the invention, tumbler 92 is alternatively rotated about shaft 96 in a clockwise direction and then in a counterclockwise direction for a predetermined period of time. Each rotation is preferably about 180° in each direction with respect to a reference point at the perimeter of the tumbler.

Those skilled in the art will appreciate that the motion of tumbler 92 is intended to assist in bringing treatment gas and liquid into contact with the food product. Accordingly, the present invention contemplates a number of different motion patterns of tumbler 92. For example, in another embodiment of the invention, tumbler 92 is axially oscillated along shaft 96. In yet another embodiment, tumbler 92 is vibrated in a vertical or horizontal reciprocating motion or both. All such motion patterns are within the scope of the present invention.

In yet another embodiment of the invention, treatment chamber 42 itself can receive the food commodity directly without the use of an internally mounted device, such as tumbler 92. In this case, treatment chamber 42 can be configured to have separate internal compartments or not depending upon the particular food commodity. Those skilled in the art will appreciate that a number of different commercially available massagers and tumblers can be used with the present invention. For example, massager machines having "T0, T1" etc. model designations available from Lutetia (Arnouville, France), "Reiser Ultra Vac" tumblers having capacities ranging from 500 lbs. to 10,000 lbs. available from AMFEC (Hayward, Calif.), tumblers having "MM-03, MM-10," etc. model designations having capacities ranging from 750 lbs. to 22,000 lbs. available from Challenge-RMF Inc. (Grandview, Mo.), and "Tumbler BAMIX" available from Armor Inox (Mauron, France), and the like.

In operation, desired ozone concentration and treatment gas pressures are established in gas delivery system 44 by activating ozone generator 46 and opening valves 63, 66 and 78. The desired ozone concentration in the treatment gas is achieved by monitoring gas samples with ozone analyzer 54. Once the desired ozone concentration level in pressure vessels 48 and 50 is attained, ozone generator 46 is switched off.

The desired operating pressure is established in gas delivery system 44 by closing valves 63 and 78 and injecting carbon dioxide into pressure vessel 48. Both pressure vessels 48 and 50 are pressurized to operating pressure. The ozone concentration is periodically monitored and the concentration is controlled by opening valve 78 and injecting carbon dioxide to reduce the concentration, or supplying more ozone from ozone generator 46 to increase the ozone concentration as needed.

A predetermined weight of a food commodity is placed into tumbler 92 and the tumbler is sealed within treatment chamber 42. As described above, water or aqueous solution is added to a desired level before, during or after introduction of the treatment gas. In one embodiment, about 0.001 to about 0.5 grams, and more preferably about 0.05 to about 0.15 grams of water per gram of food commodity is introduced into treatment chamber 42. Next, valves 45, 84 and 88 are closed and valve 81 is opened to draw a vacuum in gas feed line 43 and in treatment chamber 42. Then, valve 81 is closed and valve 45 is opened until treatment chamber 42 reaches atmospheric pressure. Then, valve 45 is closed and the actuator is turned on. In a preferred embodiment, the actuator is set to reciprocally rotate tumbler 92 at a predetermined revolutions per minute (RPM). As described above, the rotational motion can vary depending upon the particular process. In one embodiment, tumbler 92 is rotated at about 1 to about 30 RPM. Alternatively, tumbler 92 can oscillate at about 1 to 30 RPM, where one revolution is defined as one clockwise rotation of about 1800 and one counterclockwise rotation of about 1800. The RPM of the tumbler can vary from about 0.5 to about 30 RPM and, more preferably, from about 10 RPM to about 20 RPM. The processing time can vary depending upon the amount of the food commodity placed in the tumbler and the system operating parameters. In a preferred method, processing is carried out for a predetermined period of time that can range from about 2 to about 360 minutes. More preferably, the treatment time varies from about 2 minutes to about 90 minutes. Once the processing is complete, treatment chamber 42 and gas feed line 45 are purged with inert gas by closing valve 45 and opening valves 84 and 88.

Those skilled in the art will recognize that a wide variety of processing conditions with treatment chamber 42 are possible through the operation of apparatus 40. For example, the treatment of a food commodity within treatment chamber 42 can be carried out under either pressurized or vacuum atmospheric conditions and over a wide range of ozone concentration levels. The operating pressure can be varied from below about 2 inches of Hg to well over atmospheric pressure. In a preferred embodiment, the treatment process is carried out at a vacuum pressure of about 2 to about 25 inches of Hg and, more preferably, about 10 to about 25 inches of Hg. Additionally, the temperature of treatment chamber 42 can be controlled through the use of heating and cooling systems (not shown) and can vary over a wide range. For example, treatment chamber 42 can be regulated at a temperature ranging from 30 about −200° C. to about 50° C. More preferably, the temperature of treatment chamber 40 can be controlled at a specific temperature within a range of from about 0.1° C. to about 25° C. Further, water or aqueous solution can be applied to the food commodity before, during or after application of treatment gas.

In a preferred embodiment, an ozone concentration and treatment gas pressure are established in gas delivery system 44 that will permit delivery of treatment gas containing a wide range of ozone concentration levels. In one preferred embodiment, at least about 0.001 mg of ozone per gram of food commodity to be supplied by delivery system 44. In another embodiment, gas delivery system 44 supplies at least about 0.05 mg of ozone per gram of food commodity. In yet another embodiment delivery system 44 supplies at least about 1.0 mg of ozone per gram of food commodity. In a still further embodiment delivery system 44 supplies at least about 2.0 mg of ozone per gram of food commodity. In another preferred embodiment, gas delivery system 44 supplies about 0.01 to about 2.0 mg of ozone per gram of food commodity. In a more preferred embodiment, gas delivery system 44 supplies about 0.125 to about 2.0 mg of ozone per gram of food commodity. In a still more preferred embodiment, gas delivery system 44 supplies about 0.4 to about 0.6 mg of ozone per gram of food commodity.

In a most preferred processing embodiment for a food commodity such as poultry, the ozone concentration in the treatment gas is maintained at about 0.5 mg/g meat and a treatment time of about 15 minutes is used. Water is added to create a moisture content of about 13% by weight and a tumbling speed of about 18–20 RPM is used. The treatment temperature is preferably maintained at about 20° C. at atmospheric pressure.

Using the foregoing description, it is believed that those skilled in the art can practice the invention to its fullest extent. Accordingly, the following examples and description are merely intended to be explanatory of the invention and not intended to limit the invention in any way whatsoever.

EXAMPLE I

Several experiments were carried out to evaluate the efficacy of the gaseous ozone process with moisture on the selected food borne pathogen, i.e., *Salmonella enteritidis* and to assess the optimal ozone processing parameters on other food borne pathogens (i.e., *L. monocytogenes, E. coli* O157:H7, and generic *E. coli*) and spoilage microorganisms (i.e., lactic acid bacteria and natural meat isolate).

I. Inoculum Preparation

Since spot inoculation represents the most likely contamination pattern in nature, spot inoculation was used to inoculate the chicken coupons used in the experiments described herein.

A. Generic *E. coli*

Each strain of a three-strain mixture of generic *Escherichia Coli* (all beef isolates, obtained from University of Georgia) was maintained in tryptic soy broth (TSB) (Difco Laboratories, Detroit, Mich.) and stored at about 4° C. between subcultures. To activate cultures prior to use, loop transfers (1% inocula) were made for two consecutive days in TSB and incubated at about 35° C. for about 16 to 20 hours. Cell counts in the suspension generally ranged around $10^9$ colony forming units per milliliter (CFU/ml). The three strains were then combined at about equal concentrations.

B. *E. coli* O157:H7

Each strain of a two-strain mixture of *Escherichia coli* O157:H7 (both beef isolates, obtained from University of Georgia) was maintained in tryptic soy broth (TSB) (Difco Laboratories, Detroit, Mich.) and stored at about 4° C. between subcultures. To activate cultures prior to use, loop transfers (1% inocula) were made for two consecutive days in TSB and incubated at about 35° C. for about 16 to 20 hours. Cell counts in the suspension generally ranged around $10^9$ CFU/ml. The two strains were then combined at about equal concentrations.

C. *Listeria monocytogenes*

Four strains of *Listeria monocytogenes* (N-7031-Cabbage isolate; N-7298-Clinical isolate; N-7325-ATCC; and N-7327-Radish isolate all obtained from National Food Processors Association) were maintained in tryptic soy broth (TSB) (Difco Laboratories, Detroit, Mich.) and stored at 40° C. between subcultures. To activate cultures prior to use, loop transfers (1% inocula) were made for two consecutive days in TSB and incubated at about 35° C. for about 16 to 20 hours. Cell counts in the suspension generally ranged around $10^8$ to $10^9$ CFU/ml. The four *L. monocytogenes* cultures were then combined at equal ratios.

D. *Salmonella enteritidis*

*Salmonella enteritidis* E565-88 (food isolate, obtained from University of Georgia) was maintained in tryptic soy broth (TSB), and stored at about 4° C. between subcultures. To activate culture prior to use, loop transfers (1% inocula) were made for two consecutive days in TSB and incubated at about 35° C. for about 16 to 20 hours. Cell counts in the suspension generally ranged around $10^9$ CFU/ml.

E. Lactic Acid Bacteria (LAB)

Four strains of lactic acid bacteria (LAB) strains (HPS-Pediococcus sp; LP-*Pediococcus pentosaceous*; LL2-*Lactobacillus plantarum* obtained from Chr. Hansen, McFarland, Wis., and 8014-*Lactobacillus plantarum* ATCC 8014 obtained from ATCC, Manassas, Va.) were maintained in Lactobacilli MRS broth (Difco Laboratories, Detroit, Mich.). They were stored at about 4° C. between subcultures. To activate cultures prior to use, loop transfers (1% inocula) were made for two consecutive days in MRS broth and incubated at about 35° C. for about 16 to 20 hours. Cell counts in the suspension generally ranged around $10^8$ to $10^9$ CFU/ml. The four strains were then combined at equal ratios.

F. Meat Spoilage Microorganisms

The culture of natural meat spoilage microorganisms was enumerated by swabbing the beef surface and cultured the swab in tryptic soy broth (TSB) (Difco Laboratories, Detroit, Mich.) at about 35° C. overnight. The culture was stored at about 4° C. between subcultures. To activate cultures prior to use, loop transfers (1% inocula) were made every 24 hours for two consecutive days in TSB and incubated at about 35° C. for about 16 to 20 hours. Cell counts in the suspension generally ranged around $10^8$ to $10^9$ CFU/ml.

II. Meat Sample Preparation

Irradiated boneless chicken breast samples were purchased from Royalty Food, Inc. (Orlando, Fla.). The chicken samples were irradiated by Food Technology Service, Inc. (Mulberry, Fla.), and normally came as frozen, single lobe (4-oz portion). The microbial quality of an irradiated chicken breast sample was negative with respect to Salmonella and about 2 log with respect to Aerobic Plate Counts. The frozen samples were transferred to a 2° C. refrigerator and thawed overnight. The following day, each single lobe breast sample was aseptically cut into a 2"×2" coupon. The coupons were stored in a freezer prior to use.

The frozen chicken breast coupons were thawed overnight before each experiment. One 0.5 inch diameter Millipore, model AP10, filter disk (Millipore Corporation, Bedford, Mass.) was placed on each coupon. Then, about 0.1 ml of inoculum was placed onto the filter disk and then allowed to set at room temperature for about 30 min to allow cell attachment. A 20–200 $\mu$l micropipetter (VWR Scientific, Chicago, Ill.) was used to dispense the inoculum. The inoculated filter discs were removed from the chicken coupons after about 30 min. Inoculated chicken coupons were randomly grouped into trays (3/tray), weighed, and refrigerated before the treatment.

III. Experiment Conditions

In accordance with the operational description of apparatus 40 set forth above, ozone generator 46 was turned on and valves 63, 66 and 78 were opened. Ozone generator 46 was turned off after pressure vessels 48 and 50 reached a desired ozone concentration. Then, valves 63 and 78 were closed and valve 66 was allowed to remain open. The ozone concentration in the treatment gas was monitored by ozone analyzer 54. Carbon dioxide ($CO_2$) was injected into pressure vessel 48 to pressurize both pressure vessels 48 and 50 to about 30 psig. Then, valve 66 was closed and valve 70 was opened to determine the ozone concentration in pressure vessel 50. For the series of experiments described herein, the ozone concentration in the treatment gas was adjusted to about 0, 0.125, 0.25, 0.5, 1, and 2 mg per gram of chicken (based on all three pieces).

The above procedure was followed prior to the addition of water and sealing the reaction chamber. A tray of inoculated chicken coupons was then removed from the refrigerator and the amount of water and ozone required was calculated. The amount of sterile deionized water used was 13% by weight for each set of three coupons, and the water was dispensed into treatment chamber 42 using a 10-ml pipette. To ensure the even distribution of water in the chamber, the water was equally divided between the back, middle, and front of treatment chamber 42.

Then, the chicken coupons were loaded into the stainless steel wire cage and each coupon was placed into a separate compartment in the reaction chamber. In this design, no two chicken coupons could stack on each other and each coupon received the maximum exposure to the treatment gas. The cage was inserted into treatment chamber 42, and the chamber was sealed.

To initiate the process, valves 45, 84 and 88 were closed and 81 was opened to draw a vacuum on gas feed line 43. Then vacuum pump 80 was turned on until the vacuum gauge reached 24 inches Hg. In this experiment, a model DAA-V17A-EB vacuum pump was used (Gast Manufacturing, Benton Harbor, Mich.). Next, valve 81 was closed and the vacuum pump was shut off. Then, valve 45 was opened until the pressure in vacuum line 60 reached about 0 psig. Valve 45 was then closed and the pneumatic actuator was turned on and the timer was started. For the series of experiments described here, the treatment times were about 0, 5, 8, 15, 30, and 45 minutes. Following each experiment, the actuator was turned off and valves 84 and 88 were opened, and treatment chamber 42 was flushed with carbon dioxide for about 20 seconds.

For each experiment, the motion of the tumbler was bidirectional, not unidirectional like a typical tumbler. The tumbler rotated approximately 180 degrees in one direction and then rotated back the other direction. Both rotations counted as one revolution. The number of revolutions per minute (RPM) was 16 to 20 for these experiments. In all experiments, the temperature of treatment chamber 42 was kept at about ambient temperature (20° C.).

IV. Microbiological Analysis

Following treatment, each chicken coupon was put into a 24-oz sterile Whirl-pak plastic bag (Nasco, Fort Atkinson, Wis.) with 90 ml of sterile 0.1% peptone water, and pummeled for 2 min at normal speed with a Stomacher 400 Lab-blender. Each sample was then serially diluted. One milliliter of sample from each dilution was plated on the appropriate growth medium. Duplicates were made from each dilution. Lactic acid bacteria (LAB) were plated on 3M Redigel™ MRS Test Media (Minnesota Mining and Manufacturing Company, St. Paul, Minn.) and incubated at 35° C. in a $CO_2$ incubator (5% $CO_2$) for 48 h. Both *E. Coli* 0157:H7 and generic *E. coli* were plated on *E. coli* Count Plates Petrifilm™ (3M, St. Paul, Minn.) and incubated at 35° C. for 48 h. *L. monocytogenes* were enumerated on PALCAM Agar (Difco Laboratories, Detroit, Mich.) by spread plates and incubated at 35° C. for up to 5 days. *S. enteritidis* and natural meat spoilage microorganisms were enumerated on Aerobic Count Plates Petrifilm™ (3M, St. Paul, Minn.) and incubated at 35° C. for 48 h. The colonies were counted after the incubation time. The count was recorded and expressed as CFU/g.

V. Effect of Treatment Gas on Microbial Inactivation

Figure 4:
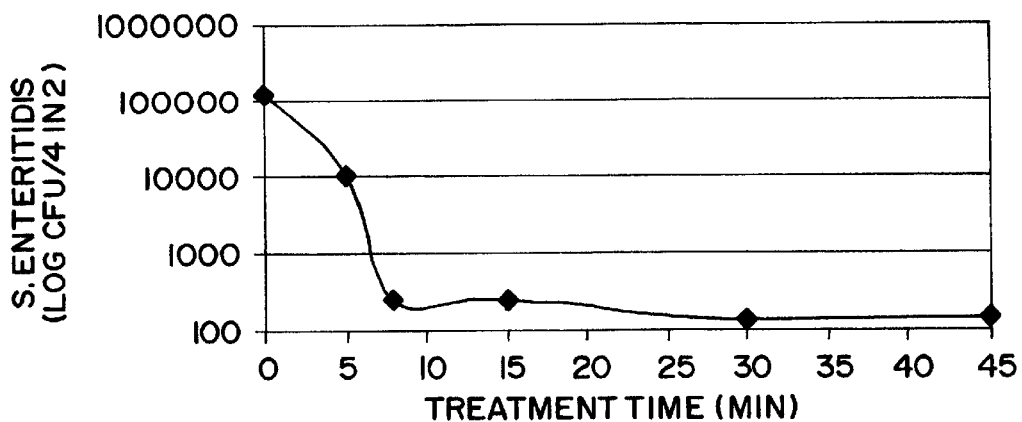
FIG. 4 is a plot illustrating microorganism population versus exposure time for chicken coupons processed in accordance with the invention.

FIG. 4 shows the ozone biocidal efficacy for times ranging from 5 to 45 minutes for a fixed ozone concentration of 2 mg/g and with 13% by weight added sterile moisture. The data shown in FIG. 4 indicates that the microbial population decreases rapidly up to about 7 to 8 minutes and decreases slowly at increasing treatment times greater than about 8 minutes.

Figure 5:
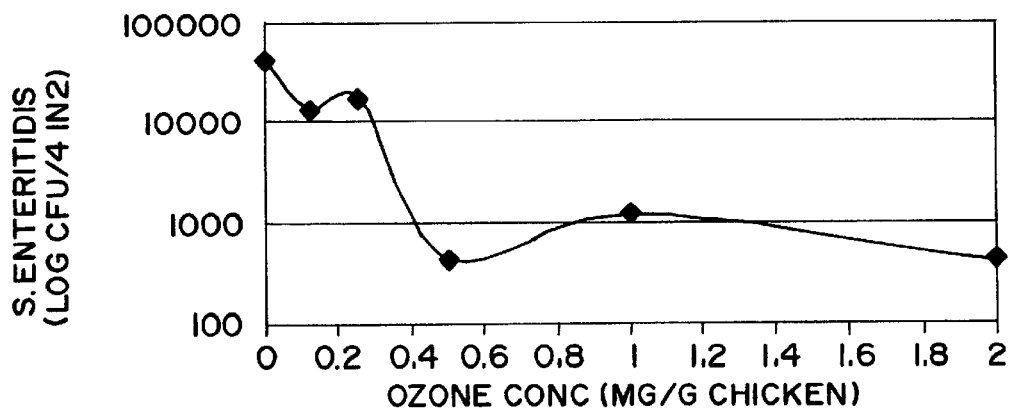

FIG. 5 shows the biocidal efficacy for different ozone concentrations ranging from about 0.125 to about 2 mg/g chicken with 13% added sterile moisture at a fixed treatment time of about 15 minutes. The biocidal efficacy increases rapidly with increasing ozone concentration and levels off at about 0.5 mg/g chicken. No notable changes in texture or color of the chicken coupons were observed with the various levels of ozone.

Figure 6:
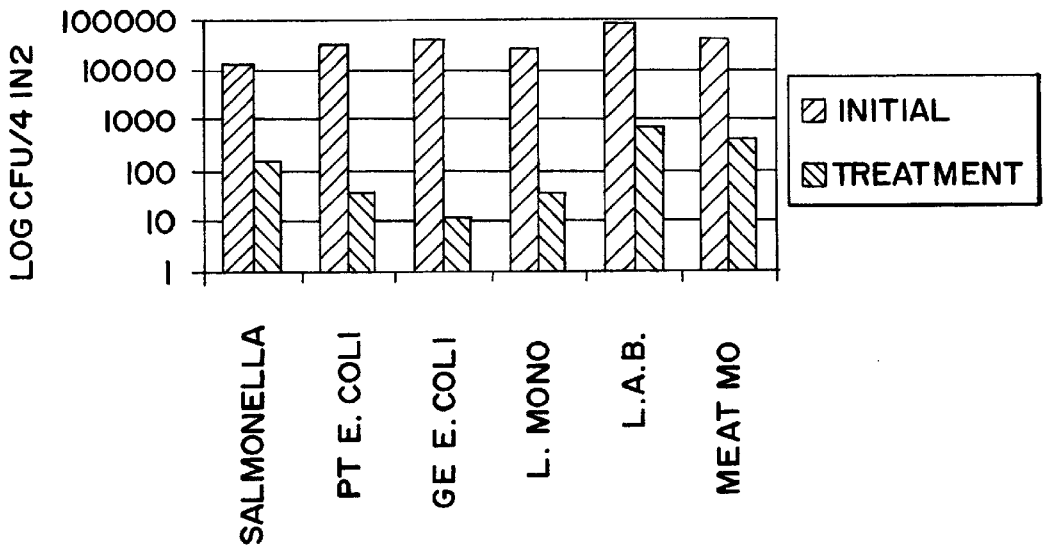
FIG. 6 is a histogram illustrating the survival of microorganism populations for various microorganisms on chicken coupons after treatment in accordance with the invention.
Figure 7:
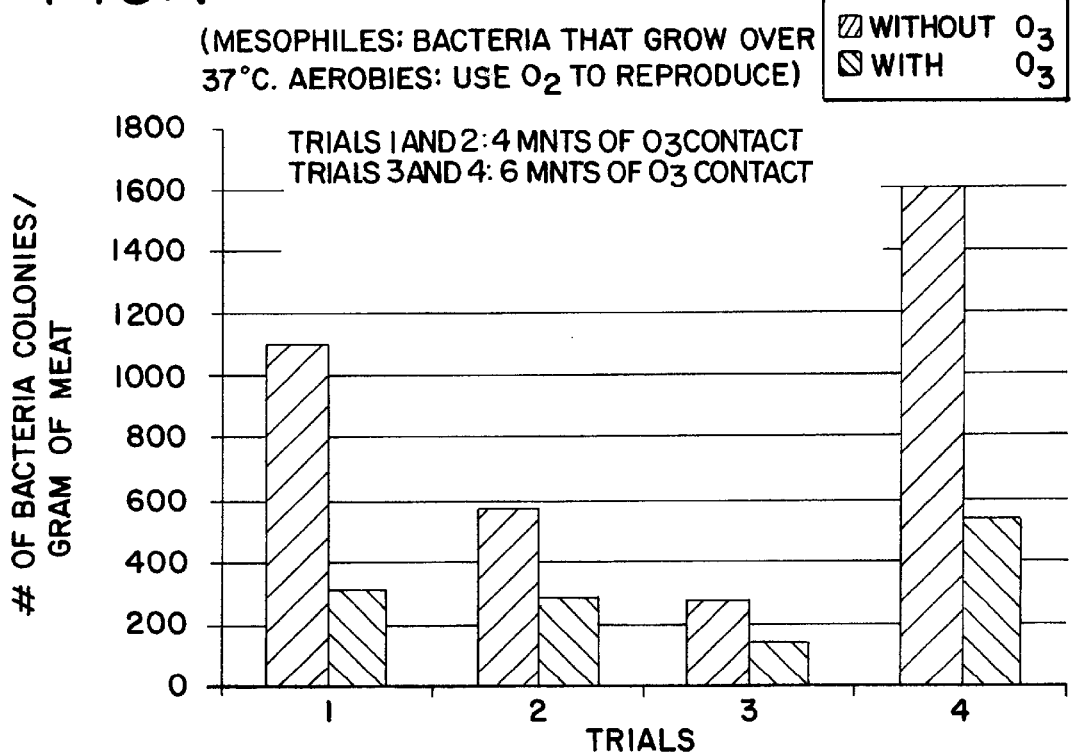
FIGS. 7 and 8 are comparative histograms illustrating the survival of the total microorganism population on chicken breasts processed in accordance with the invention and in accordance with an ozone-free process.

The data shown in FIGS. 6 and 7 illustrate the effectiveness of the treatment process on the different microorganisms used in this experiment. FIG. 7 is the subset data of FIG. 9 and shows the relative reduction (initial counts minus survival) of different microbial populations on chicken coupons treated with ozone. The microbial reduction in log units for *S. enteritidis, E. coli* 0157:H7, generic *E. coli, L. monocytogenes*, lactic acid bacteria, and natural meat spoilage microorganisms were 1.96, 2.88, 3.52, 2.83, 2.11, and 1.94, respectively. The data indicates *S. enteritidis* had greater resistance to ozone inactivation among all challenge microorganisms. However, other than *S. enteritidis*, natural spoilage microorganisms (e.g., lactic acid bacteria and natural meat isolate) were more resistant to ozone than pathogenic microorganisms.

The reduction in pathogenic bacteria shows that, based on a natural microbial population and distribution, this inventive process can reduce pathogenic bacteria, yet maintain a certain level of spoilage microorganisms. This is an important result because natural spoilage microflora also serve as a defense against subsequent pathogens that come in contact with the food commodity.

In summary, the experimental results demonstrate that the gas treatment of the invention with added moisture can significantly reduce pathogens on the surface of the chicken coupons. The inventive process is able to reduce *S. enteritidis, E. coli* 0157:H7, generic *E. coli, L. monocytogenes*, lactic acid bacteria, and natural meat spoilage microorganisms levels by 1.96, 2.88, 3.52, 2.83, 2.11, and 1.94 log units, respectively.

EXAMPLE II

FIG. 7 illustrates in bar chart form comparative testing with and without ozone in removing bacteria from chicken breasts. In Tests 1 and 2, the chicken breasts were contacted with ozone gas for a period of 3 minutes, while in Tests 3 and 4, the chicken breasts were contacted with ozone for a period of 6 minutes. In Test 1, a 73% reduction with ozone is seen, while in Test 2, a 48% reduction is seen. Test 3 showed a 40% reduction, while Test 4 showed a 70% reduction in bacterial count. It may thus be seen that a bacterial count reduction of at least 40% is obtainable with as little as 6 minutes time contacted with ozonated gas.

Figure 8:
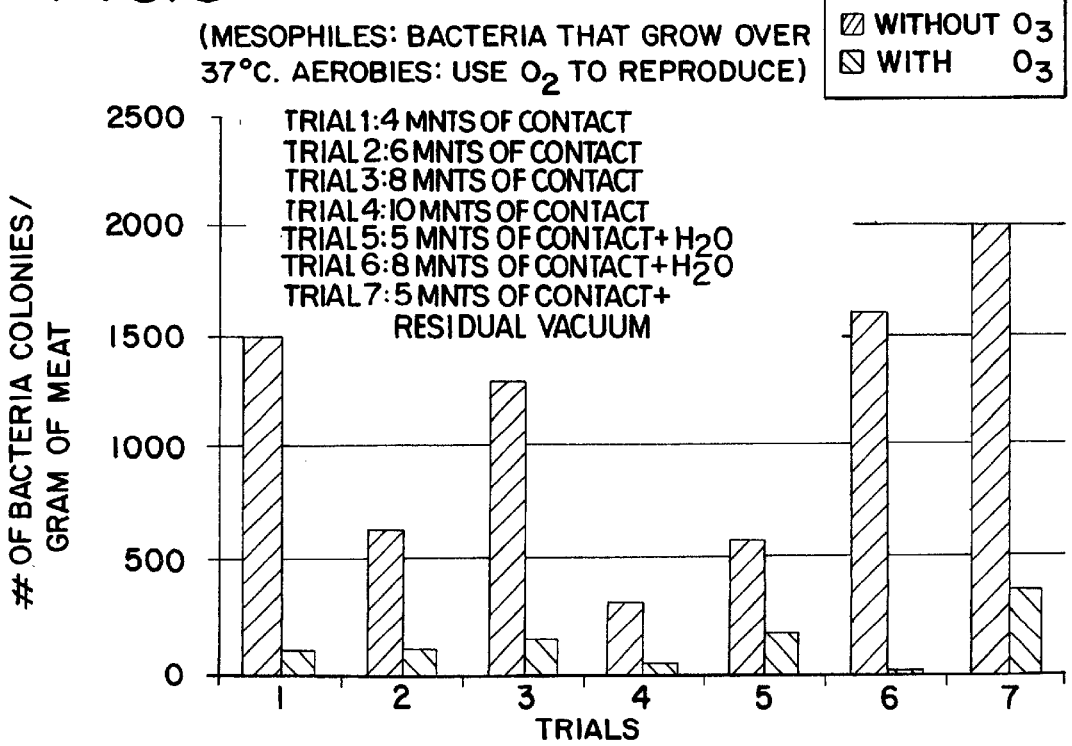

FIG. 8 illustrates in bar chart form 7 other tests performed in accordance with the present invention. Tests 1, 2, 3, and 4, exemplified in FIG. 8 resemble the tests carried out as explained previously for FIG. 2. Test 1 of FIG. 8 showed a 93% reduction, Test 2 showed an 83% reduction, Test 3 showed an 88% reduction, and Test 4 showed an 83% reduction in bacterial count. Tests 5 and 6 illustrate the effect of a thin film of water in helping the contact time for the ozone. Test 5 showed a 73% reduction in bacterial count, while Test 6, the best test of all runs showed a 98% reduction in bacterial count. Finally, Test 7 showed the comparison with and without ozone gas treatment using residual vacuum.

From the above testing, it can be seen that great reduction in bacterial count may be obtained simply by the use of either ozonated gas, or ozonated water which appears as a thin film on the surface of the meat.

Thus it is apparent that there has been disclosed in accordance with the invention, a method for food disinfection using gaseous ozone that fully provides the advantages set forth above. Although particular embodiments of the invention have been described, it will be apparent to one skilled in the art that numerous modifications and variations can be made to the presented embodiments, which still fall within the spirit and scope of the invention. Accordingly, it is intended that all such variations and modifications fall within the scope of the appended claims and equivalents thereof.

What is claimed is:

1. A method of decreasing bacterial count in raw meat, the method comprising the steps of:
    (a) placing the meat in a container, and sealing the container;
    (b) evacuating the container to a vacuum of at least about 2 inches Hg to about 25 inches Hg;
    (c) generating a fluid stream containing ozone;
    (d) contacting the meat with the fluid stream containing ozone while agitating the container, said contacting being for a time sufficient to reduce the bacterial count by at least 40% compared to without ozone.

2. The method of claim 1, wherein the fluid stream containing ozone is injected into the container until a pressure ranging from just below to just above 1 atmosphere pressure is reached in the container.

3. The method of claim 1, wherein a small amount of water is injected into the container just prior to or during step (d) so that a thin film of ozonated water is produced on the meat surface.

4. The method of claim 1 further comprising a step (e) of evacuating the container to remove residual ozone from the container.

5. The method of claim 1, wherein steps (b) and (c) are performed simultaneously.

6. An apparatus for use in decreasing the bacterial count in raw meat, the apparatus comprising a container which may be sealed after the meat is placed therein, the container capable of being agitated with agitation means; a conduit leading to an evacuating means, the evacuating means being able to provide a vacuum to the container of at least about 10 inches of mercury, preferably at least 25 inches of mercury; an ozone generating device connected to the container via injector means able to provide an ozone containing fluid stream to the container; and vent means for venting the ozone containing fluid until it is needed.

7. A method for reducing microorganisms on a food commodity comprising:
    providing a tumbler;
    introducing an aqueous solution into the tumbler;
    placing the food commodity in the tumbler;
    introducing a fluid comprising ozone into the tumbler;
        vibrating the tumbler in oone of a vertical direction, a horizontal direction and both a vertical direction and horizontal direction; and maintaining said tumbler vibration for a time sufficient to reduce the bacterial count by at least 40% compared to without ozone.

8. The method of claim 7, wherein introducing a fluid comprising ozone comprises introducing at least about 0.001 gram of ozone per gram of food commodity.

9. The method of claim 7, wherein introducing a fluid comprising ozone comprises introducing at least about 0.5 mg of ozone per gram of food commodity.

10. The method of claim 7, wherein introducing a fluid comprising ozone comprises introducing at least about 1.0 mg of ozone per gram of food commodity.

11. The method of claim 7, wherein introducing a fluid comprising ozone comprises introducing at least about 2.0 mg of ozone per gram of food commodity.

12. The method of claim 7, wherein introducing a fluid comprising ozone comprises introducing at about 0.4 to about 0.6 mg of ozone per gram of food commodity.

13. The method of claim 7, wherein the predetermined period of time comprises about 2 minutes to about 360 minutes.

14. The method of claim 7, wherein introducing an aqueous solution comprises introducing water.

15. The method of claim 14, wherein introducing an aqueous solution comprises introducing an aqueous ozone solution.

16. The method of claim 14, wherein introducing an aqueous solution comprises introducing about 0.001 to about 0.5 grams of water per gram of food commodity.

17. The method of claim 7, wherein providing a tumbler comprises providing a tumbler having a rotational axis, and wherein setting the tumbler in motion comprises rotating about the rotational axis.

18. The method of claim 17, wherein rotating the tumbler comprises rotating the tumbler at about 0.5 to about 30 revolutions per minute.

19. The method of claim 17, wherein rotating the tumbler comprises alternatingly rotating the tumbler in a clockwise direction and in a counterclockwise direction at about 1 to about 30 revolutions per minute.

20. The method of claim 19, wherein each revolution comprises one clockwise rotation and one counterclockwise rotation, and wherein a clockwise rotation and a counter clockwise rotation comprise about a 180° rotation of the tumbler with respect to a reference point at a perimeter of the tumbler.

21. The method of claim 7, wherein providing a tumbler comprises providing a tumbler having a shaft, and wherein setting the tumbler in motion comprises axially oscillating the tumbler along the shaft.

22. The method of claim 7, wherein the tumbler is maintained at a temperature of about −200° C. to about 50° C.

23. The method of claim 22, wherein the tumbler is maintained at a temperature of about 0.1° C. to about 25° C.

24. The method of claim 7, wherein introducing an aqueous solution and introducing a fluid comprising ozone are performed simultaneously after placing the food commodity in the tumbler.

25. The method of claim 7, wherein placing the food commodity in the tumbler comprises placing a food commodity selected from the group consisting of meat, poultry, fish, seafood, fruits and vegetables.

26. A method for reducing microorganisms on a food commodity comprising:

providing a tumbler having a rotational axis;

purging the tumbler with a purge gas;

placing the food commodity in the tumbler;

introducing about 0.125 to about 2.0 grams of a gas comprising ozone per gram of meat and introducing an aqueous solution into the tumbler;

rotating the tumbler about the rotational axis; and purging the tumbler with the purge gas.

27. The method of claim 26, wherein placing the food commodity in the chamber comprises dividing the food commodity into portions and placing one or more portions into chambers of a fixture and inserting the fixture into the tumbler.

28. The method of claim 26, wherein the purge gas is selected from the group consisting of nitrogen, carbon dioxide, air, argon and mixtures thereof.

29. The method of claim 26, wherein the pressure within the tumbler is controlled to a vacuum pressure of about 2 to about 25 inches Hg while rotating the tumbler.

30. The method of claim 26, wherein placing the food commodity in the tumbler comprises placing a food commodity selected from the group consisting of meat, poultry, seafood, fruits and vegetables.

31. The method of claim 26, wherein rotating the tumbler comprises alternatingly rotating the tumbler in a clockwise direction and a counterclockwise direction for about 2 minutes to about 360 minutes.

* * * * *

UNITED STATES PATENT AND TRADEMARK OFFICE
CERTIFICATE OF CORRECTION

PATENT NO.   : 6,485,769 B2
DATED        : November 26, 2002
INVENTOR(S)  : Stephane Audy et al.

It is certified that error appears in the above-identified patent and that said Letters Patent is hereby corrected as shown below:

<u>Column 12,</u>
Line 45, please delete the word "oone" and replace it with the word -- one --.

Signed and Sealed this

Twelfth Day of August, 2003

JAMES E. ROGAN
*Director of the United States Patent and Trademark Office*